US008038098B2

(12) United States Patent
Johnson et al.

(10) Patent No.: US 8,038,098 B2
(45) Date of Patent: Oct. 18, 2011

(54) OVERHEAD LUGGAGE BIN FOR AIRCRAFT INTERIOR

(75) Inventors: Glenn A. Johnson, King, NC (US);
Jeffrey W. Hontz, Rural Hall, NC (US);
Geraldine Arnold, Winston-Salem, NC (US); Mark W. Peurifoy,
Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 797 days.

(21) Appl. No.: 12/101,580

(22) Filed: Apr. 11, 2008

(65) Prior Publication Data

US 2008/0251640 A1    Oct. 16, 2008

Related U.S. Application Data

(60) Provisional application No. 60/923,062, filed on Apr. 12, 2007.

(51) Int. Cl.
*B64C 1/22*    (2006.01)

(52) U.S. Cl. .................................................. 244/118.1

(58) Field of Classification Search ............... 244/118.1, 244/118.3, 118.5, 118.6, 137.2; 312/245, 312/246, 247, 248; D12/345
See application file for complete search history.

(56) References Cited

U.S. PATENT DOCUMENTS

| 5,108,048 | A |   | 4/1992 | Chang |
| 5,456,529 | A | * | 10/1995 | Cheung ........................ 312/245 |
| 5,590,851 | A |   | 1/1997 | Ackerman |
| 6,003,813 | A | * | 12/1999 | Wentland et al. .......... 244/118.5 |
| 6,318,671 | B1 | * | 11/2001 | Schumacher et al. ..... 244/118.5 |
| 6,398,163 | B1 | * | 6/2002 | Welch et al. ............... 244/118.1 |
| 6,527,325 | B2 | * | 3/2003 | Steingrebe et al. ......... 296/37.7 |
| 6,802,478 | B2 | * | 10/2004 | Katori ....................... 244/118.1 |
| 7,588,211 | B2 | * | 9/2009 | Granzeier et al. ......... 244/118.5 |
| 7,665,692 | B2 | * | 2/2010 | Bock .......................... 244/118.5 |
| 7,823,830 | B2 | * | 11/2010 | Feldkirchner et al. ..... 244/118.1 |
| 2005/0083171 | A1 |   | 4/2005 | Hamilton |

FOREIGN PATENT DOCUMENTS

WO         2006087183 A1    8/2006
WO    WO2006/087183    *    8/2006

* cited by examiner

*Primary Examiner* — Tien Dinh
*Assistant Examiner* — Michael Kreiner
(74) *Attorney, Agent, or Firm* — Oliff & Berridge, PLC

(57) ABSTRACT

An overhead luggage bin for an aircraft interior includes a stowage compartment, an upper door movably attached to the stowage compartment and a lower door movably attached to the aircraft interior, the upper door and the lower door being moveable between a closed position and an opened position. A floor of the stowage compartment includes a first portion and a second portion movably attached to the first portion that defines a ramp surface with the lower door in the opened position for improved accessibility. An overhead luggage bin is provided with handles at opposed ends of the stowage compartment and includes one or more non-linear ridgelines and/or increased reflectance on an exterior surface for a more aesthetically pleasing appearance. An overhead luggage bin includes an RFID reader for providing increased RFID functionality. An overhead luggage bin includes a stowage compartment having an integrated handrail.

18 Claims, 12 Drawing Sheets

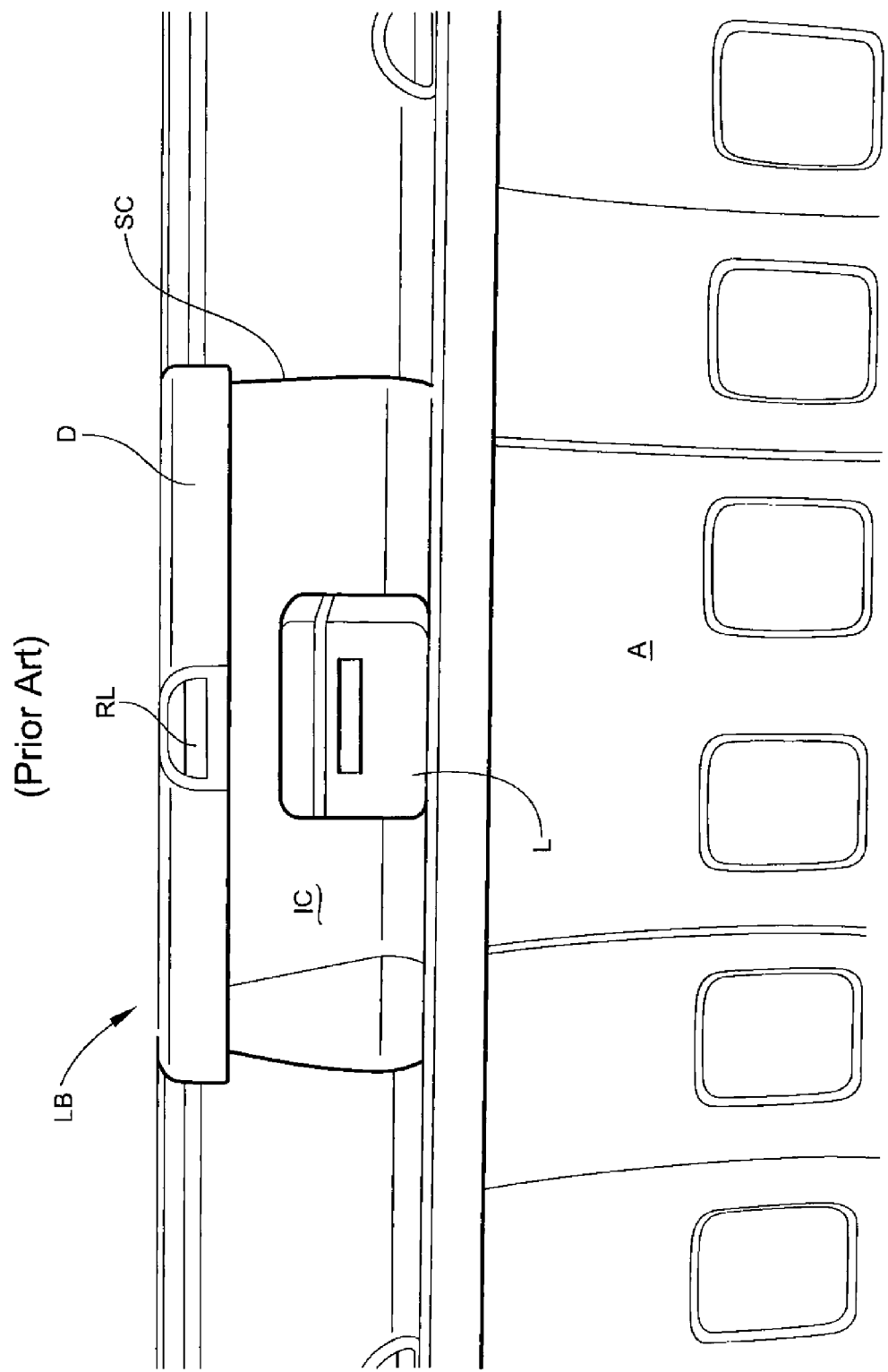

OVERHEAD LUGGAGE BIN FOR AIRCRAFT INTERIOR

CROSS-REFERENCE TO RELATED APPLICATION

This application claims the benefit of U.S. Provisional Patent Application No. 60/923,062 filed on Apr. 12, 2007, the disclosure of which is incorporated herein in its entirety.

BACKGROUND OF THE INVENTION

This invention relates generally to aircraft interior components, and more particularly, to an overhead luggage bin for an aircraft interior.

An increasing number of people from all parts of the world are experiencing travel by aircraft. At the same time, the average number of passengers per cabin personnel (e.g., stewardess, steward, flight attendant) continues to increase due to economic constraints. As a result, aircraft interior components, such as stowage compartments for storing carry-on items aboard an aircraft, commonly referred to as overhead luggage bins, must be designed for use by people of widely varying size, age and physical ability. In particular, an overhead luggage bin must be easily accessible to persons of lesser height and lesser mobility, such as females and the elderly. These individuals often have difficulty reaching the height of a conventional overhead luggage bin, which cannot be lowered significantly without compromising the headroom of a passenger seated beneath the overhead luggage bin. For example, ethnography and anthropometry studies have determined that roughly five percent (5%) of Asian females cannot access the standard overhead luggage bin of a Boeing 737 aircraft. It is estimated that the vertical distance above the cabin floor required to access the standard overhead luggage bin is more than seven inches too high for certain individuals.

In addition to improving the ergonomics of a conventional overhead luggage bin, there is an economic incentive to provide an aircraft interior that is more aesthetically pleasing. Competition among commercial aircraft operators for attracting vacation or "pleasure" travel passengers has fueled a desire to improve the aesthetics of the aircraft interior. In particular, commercial airlines are seeking simple, modern, aesthetically pleasing aircraft interiors that feature more natural lighting, surface reflections and shapes. While satisfying ergonomic concerns and being pleasing to the eye, aircraft interior components, and especially overhead luggage bins, must also be configured to take advantage of new and evolving technology. For example, radio frequency identification (RFID) technology is continually being developed for new and different applications. As a result, there is a need for an overhead luggage bin for an aircraft interior to be designed for utilizing RFID technology to provide present and future functionality.

Accordingly, it is recognized that a specific need exists for an overhead luggage bin for an aircraft interior that is both ergonomic and aesthetic. More particularly, a specific need exists for an overhead luggage bin designed for use by people of widely varying size and age, such as persons of less than average height and the elderly. In addition, a specific need exists for an aesthetically pleasing overhead luggage bin that features more natural lighting, surface reflections and shapes. Furthermore, a specific need exists for an overhead luggage bin that is configured to utilize RFID technology to provide present and future RFID functionality.

BRIEF DESCRIPTION OF THE INVENTION

In one aspect, the present invention is embodied by an overhead luggage bin for an aircraft interior that includes a generally hollow stowage compartment defining an interior cavity, an upper door and a lower door. The stowage compartment is attached to the aircraft interior. The upper door is attached to the stowage compartment and movable between a closed position and an opened position. The lower door is attached to the aircraft interior and movable between the closed position and the opened position. The stowage compartment includes a floor having a first portion and a second portion adjacent the lower door that is movably attached to the first portion. In the closed position, the upper door and the lower door cooperate to close off the interior cavity of the stowage compartment. In the opened position, the upper door is rotated upwardly relative to the stowage compartment and the lower door is rotated downwardly relative to the aircraft interior. With the lower door rotated downwardly, the second portion of the floor of the stowage compartment rotates downwardly relative to the first portion to define a ramp surface extending from the first portion in the direction of the lower door. In this manner, the vertical distance required to access the interior cavity of the stowage compartment is significantly reduced.

In yet another aspect, the present invention is embodied by an overhead luggage bin for an aircraft interior including a generally hollow stowage compartment having opposed ends and defining an interior cavity. The luggage bin further includes at least one door mounted on the stowage compartment for movement between a closed position and an opened position to provide access to the interior cavity of the stowage compartment. The luggage bin further includes at least one retaining latch operable to effect movement of the door from the closed position to the opened position. The at least one retaining latch is positioned adjacent one of the opposed ends of the stowage compartment such that the overhead luggage bin is more aesthetically pleasing.

In yet another aspect, the present invention is embodied by an overhead luggage bin for an aircraft interior including a generally hollow stowage compartment defining an interior cavity and having an exterior surface. The stowage compartment includes at least one non-linear ridgeline disposed on the exterior surface. In one exemplary embodiment, the ridgeline disposed on the exterior surface is curvilinear. In another exemplary embodiment, the non-linear ridgeline disposed on the exterior surface extends in a longitudinal direction. In yet another exemplary embodiment, the non-linear ridgeline disposed on the exterior surface defines a complex curvature. Regardless, the non-linear ridgeline is disposed on the exterior surface of the stowage compartment such that the overhead luggage bin is more aesthetically pleasing.

In yet another aspect, the present invention is embodied by an overhead luggage bin for an aircraft interior including a generally hollow stowage compartment defining an interior cavity and having an exterior surface. The exterior surface of the stowage compartment has a reflectance of the illumination within the aircraft interior greater than at least about 0.50 as measured on the albedo scale such that the overhead luggage bin is more aesthetically pleasing.

In yet another aspect, the present invention is embodied by an overhead luggage bin for an aircraft interior including a generally hollow stowage compartment defining an interior cavity and an RFID reader (receiver). In an exemplary embodiment, the stowage compartment has an exterior surface and the RFID reader is disposed on the exterior surface. In another exemplary embodiment, the RFID reader includes an RFID logic circuit operable for indicating when the RFID reader identifies a predetermined condition. In yet another exemplary embodiment, the RFID reader is operable for receiving a radio frequency (RF) signal and indicating that a corresponding item is located within the interior cavity of the stowage compartment. In yet another exemplary embodiment, the RFID reader is operable for receiving a radio frequency (RF) signal and indicating when an electronic device located within the interior cavity of the stowage compartment is in a "power on" state.

In yet another aspect, the present invention is embodied by an overhead luggage bin for an aircraft interior including a generally hollow stowage compartment defining an interior cavity. The luggage bin further includes at least one door moveably mounted on the stowage compartment and an integrated handrail. In an exemplary embodiment, the door includes an upper door movably mounted on the stowage compartment and a lower door movably mounted on the aircraft interior. In another exemplary embodiment, the upper door and the lower door are each movable between a closed position and an opened position to provide access to the interior cavity of the stowage compartment.

BRIEF DESCRIPTION OF THE DRAWINGS

An overhead luggage bin for an aircraft interior according to the present invention is best understood by reference to the following detailed description taken in conjunction with the accompanying drawing figures. The drawing figures depict features of various embodiments of an overhead luggage bin constructed in accordance with the present invention. In particular, the drawing figures depict an overhead luggage bin including a stowage compartment having an upper door and a lower door for improved accessibility. The drawing figures further depict an overhead luggage bin having door handles at opposed ends for a more aesthetically pleasing appearance. The drawing figures further depict an overhead luggage bin having at least one non-linear ridgeline and/or increased reflectance for a more aesthetically pleasing appearance. The drawing figures further depict an overhead luggage bin including an RFID reader for providing increased RFID functionality, such as indicating the presence of an item within the stowage compartment. The drawing figures further depict an overhead luggage bin including a stowage compartment having an integrated handrail.

FIG. 1A is an environmental perspective view showing a conventional overhead luggage bin.

DETAILED DESCRIPTION OF THE INVENTION

Figure 1B:
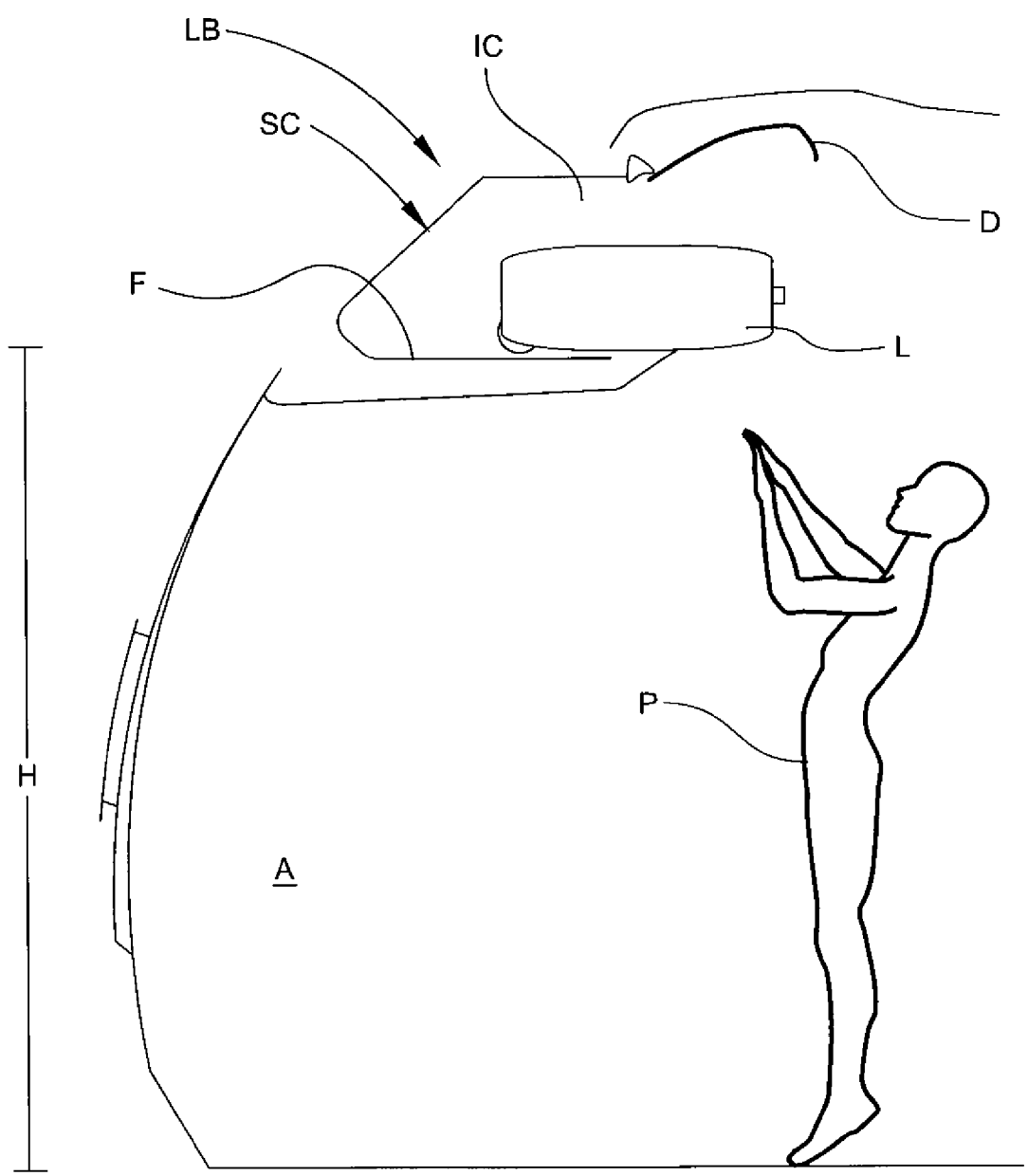
FIG. 1B is an end view illustrating the limited accessibility of the conventional overhead luggage bin of FIG. 1A.

Referring to the drawing figures, various exemplary embodiments of a stowage compartment for storing carry-on items aboard an aircraft, commonly referred to as an overhead luggage bin, are depicted. An overhead luggage bin according to the present invention provides improved ergonomics and accessibility; a more aesthetically pleasing appearance; and/or increased functionality.

FIG. 1A shows a conventional overhead luggage bin LB for stowing carry-on items aboard a transportation vehicle, such as an aircraft A, in a known manner. The overhead luggage bin LB comprises a generally hollow, box-like stowage compartment SC defining an interior cavity IC for storing the carry-on items, such as overnight luggage L. The overhead luggage bin LB further comprises a door D movably attached to the stowage compartment SC and movable between a closed position and an opened position (as shown) by means of a retaining latch RL. FIG. 1B illustrates the difficulty encountered by a person P having lesser height and/or lesser mobility to stow luggage L in the interior cavity IC of the stowage compartment SC or to retrieve luggage L from the interior cavity. In particular, it is difficult for such a person P to reach upward to the height H of the floor F of the overhead luggage bin LB, and in some instances, thereafter reach further into the interior cavity IC to insert or remove the luggage L.

Figure 2A:
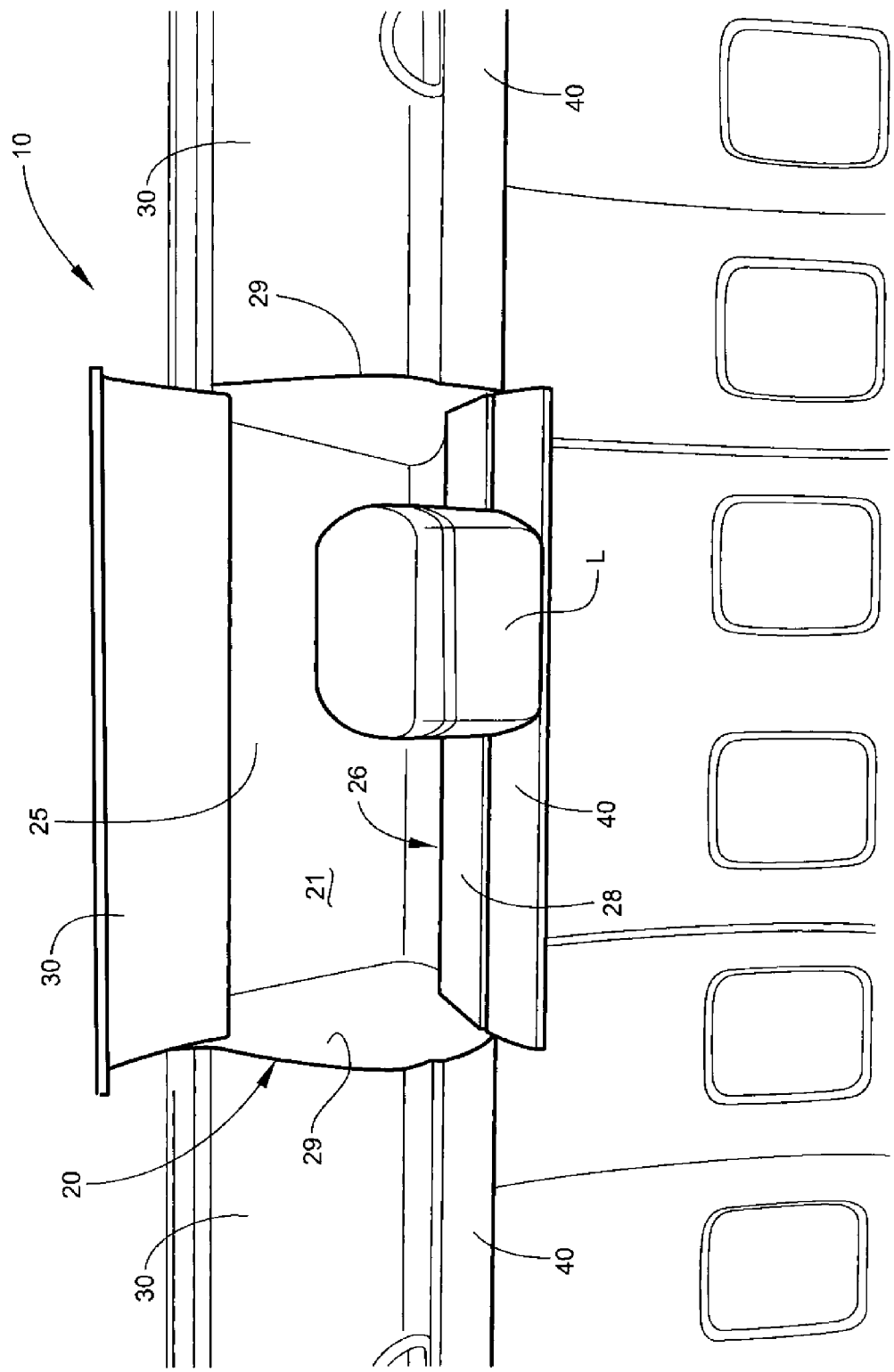
FIG. 2A is an environmental perspective view showing an exemplary embodiment of an overhead luggage bin configured in accordance with the present invention to provide improved ergonomics and accessibility.
Figure 2B:
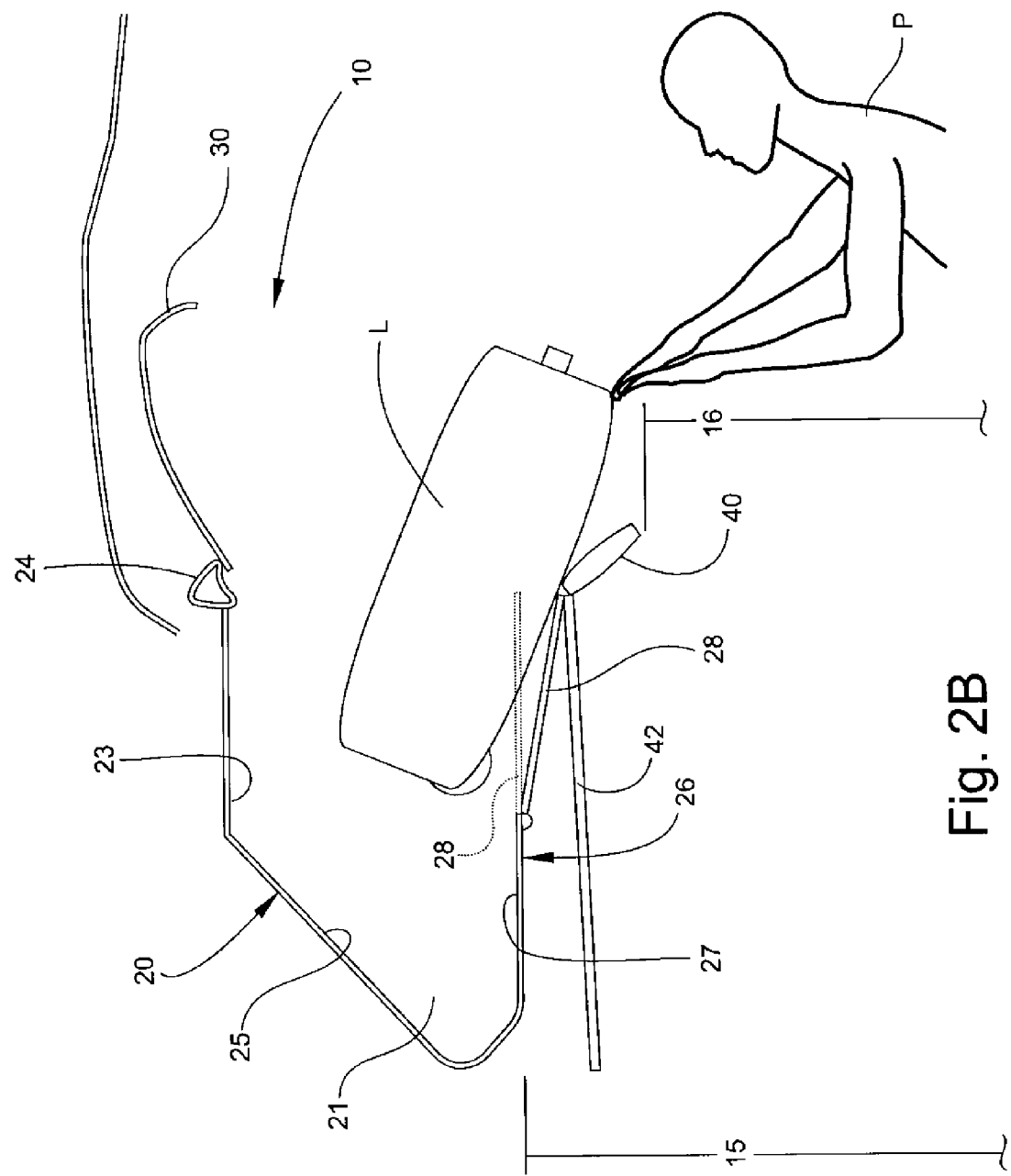
FIG. 2B is an end view illustrating the improved ergonomics and accessibility of the overhead luggage bin of FIG. 2A.
Figure 3:
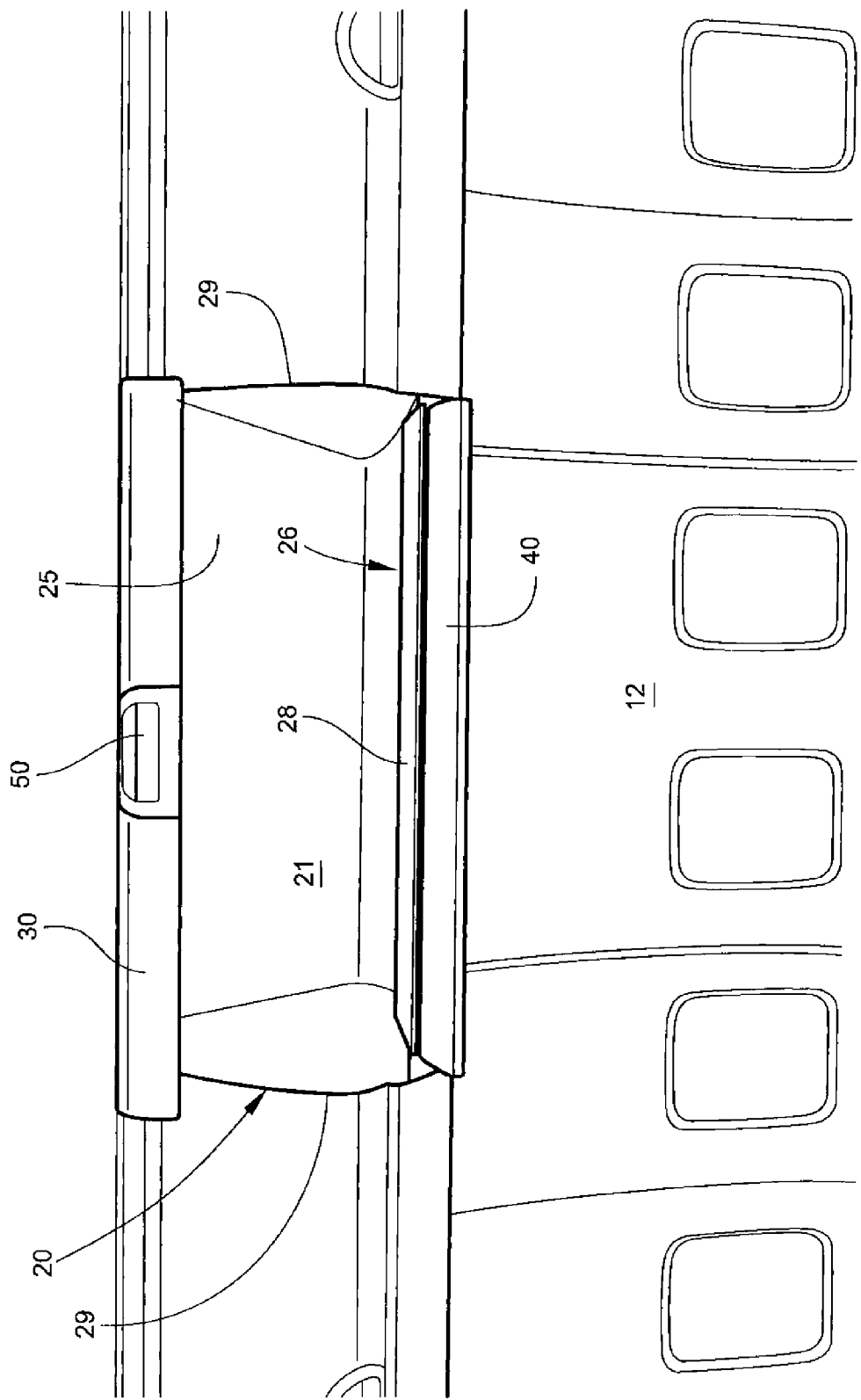
FIG. 3 is another environmental perspective view showing the exemplary embodiment of the overhead luggage bin of FIG. 2A.

An overhead luggage bin, indicated generally at 10, configured in accordance with the present invention to provide improved ergonomics and accessibility is shown in FIG. 2A, and again in FIG. 3 from a more elevated perspective and with luggage L removed for purposes of clarity. FIG. 2B illustrates the improved ergonomics and accessibility of the overhead luggage bin 10. In particular, FIG. 2B illustrates the relative ease with which a person P having lesser height and/or mobility is able to stow and retrieve luggage L from the overhead luggage bin 10. In an exemplary embodiment, the overhead luggage bin 10 comprises a generally hollow stowage compartment 20 defining an interior cavity 21 for stowing carry-on items, such as luggage L. The stowage compartment 20 comprises a ceiling panel 23 (FIG. 2B), a back panel 25, a floor panel 26 and a pair of opposed end panels 29 connected together to form a box-like opening facing toward the center of the aircraft to provide access to the interior cavity 21. The stowage compartment 20 is fixed to the aircraft interior 12 with the floor panel 26 at a predetermined height 15 so as to provide sufficient headroom for passengers seated beneath the overhead luggage bin 10. An upper door 30 is movably attached, for example rotatably attached, to the stowage compartment 20. As shown herein, the upper door 30 is hingedly attached to a leading edge 24 of the ceiling panel 23 that extends longitudinally within the aircraft interior 12. The upper door 30 is configured to be movable between a closed position and an opened position providing access to the interior cavity 21 of the stowage compartment. A lower door 40 is movably attached, for example rotatably attached, to the aircraft interior 12, and is likewise movable between the closed position and the opened position providing access to the interior cavity 21 of the stowage compartment 20. As shown herein, the lower door 40 is hingedly attached to a structural component 42 of the aircraft interior 12, such as a support frame mounted above a passenger seat.

The floor panel, referred to hereinafter as floor, 26 of the stowage compartment 20 comprises a rearward first portion 27 adjacent the back panel 25 and a forward second portion 28 adjacent the lower door 40 that is movably attached to the first portion 27. In the closed position, the upper door 30 and the lower door 40 cooperate to close off the interior cavity 21 of the stowage compartment 20, and thereby securely store carry-on items within the stowage compartment. When moved to the opened position, the upper door 30 rotates upwardly relative to the stowage compartment 20 and the lower door 40 rotates downwardly relative to the aircraft interior 12. As the lower door 40 rotates downwardly, the second portion 28 of the floor 26 rotates downwardly relative to the first portion 27 to define a ramp surface extending outwardly in the direction of the lower door. In this manner, the vertical height 16 required to access the interior cavity 21 is significantly reduced so that a person of lesser height or lesser mobility (e.g. an elderly person) can easily access the interior cavity of the stowage compartment 20 to stow and retrieve carry-on items. More particularly, the height 16 defined by the lowermost edge of the lower door 30 in the opened position is significantly reduced from the predetermined height 15 defined by the first portion 27 of the floor. In a preferred embodiment, the second portion 28 of the floor 26 defines an angle of at least about five degrees (5°) and no more than about forty-five degrees (45°) with the first portion 27. In another preferred embodiment, the vertical distance 16 is reduced relative to the predetermined height 15 up to as much as about seven inches (7").

The overhead storage bin 10 further comprises a handle 50 (FIG. 3) operable for retaining the upper door 30 and the lower door 40 in the closed position and for releasing the upper door and the lower door for movement to the opened position. The overhead storage bin 10 may also comprise biasing means (not shown), such as a spring or hydraulic/pneumatic cylinder, for assisting movement of the upper door 30 and/or the lower door 40 between the closed position and the opened position. The handle 50 may be a conventional spring-loaded retaining latch configured to retain the upper door 30 and the lower door 40 when the doors are brought together in the closed position. The upper door 30 and the lower door 40 are then allowed to move from the closed position to the opened position when a passenger or crew member operates the handle 50 to release the retaining latch.

Figure 4:
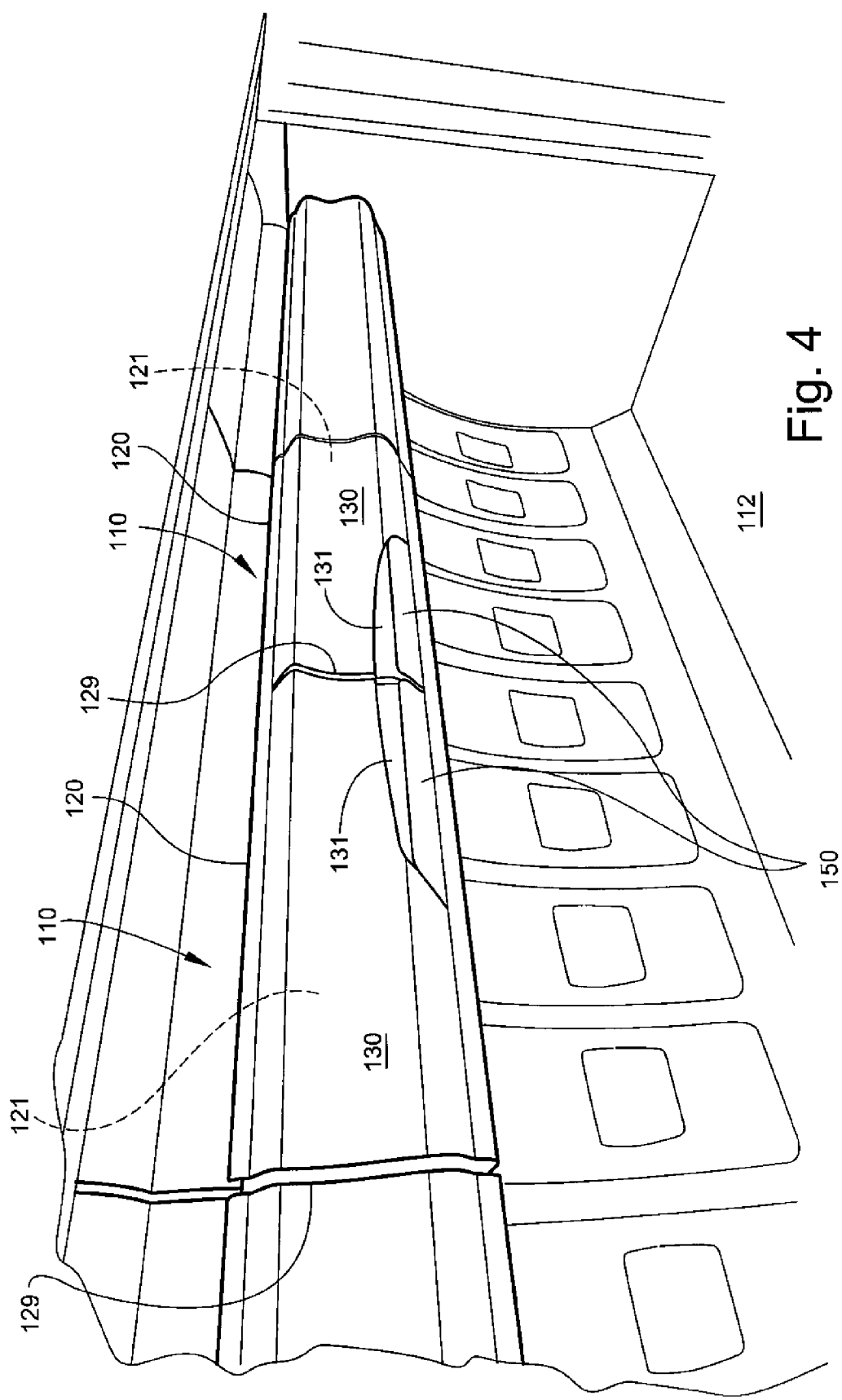
FIG. 4 is an environmental perspective view showing another exemplary embodiment of an overhead luggage bin configured in accordance with the present invention to be more aesthetically pleasing.
Figure 5:
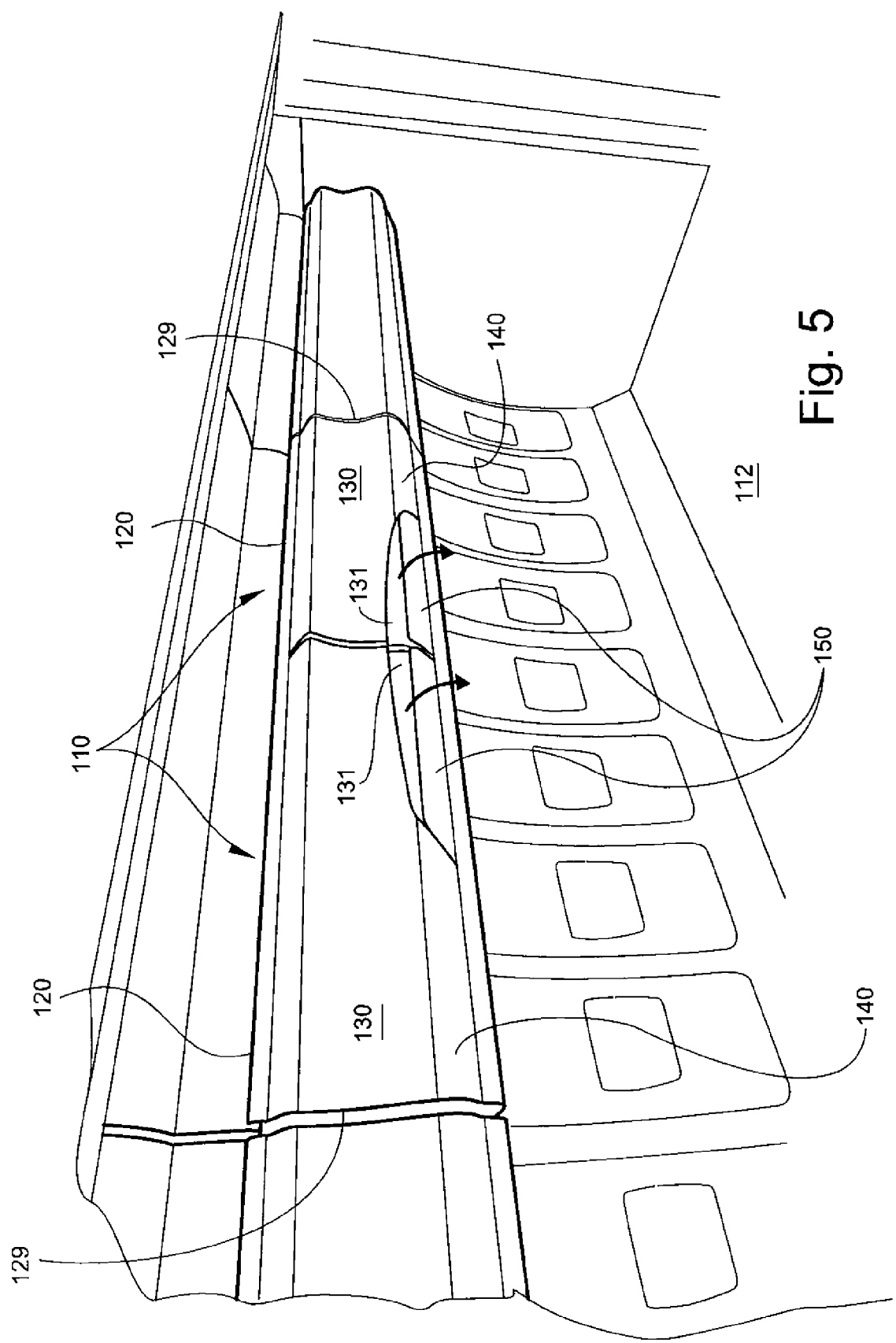
FIG. 5 is another environmental perspective view showing the exemplary embodiment of the overhead luggage bin of FIG. 4.

In another exemplary embodiment shown in FIG. 4 and FIG. 5, an overhead luggage bin 110 is provided with more aesthetically pleasing features. In particular, the overhead luggage bin 110 comprises a generally hollow stowage compartment 120 having opposed ends 129 and defining an interior cavity 121. At least one door 130 is mounted on the stowage compartment 120 for movement between a closed position and an opened position to provide access to the interior cavity 121 of the stowage compartment. The stowage compartment further comprises at least one handle 150 operable to effect movement of the door 130 from the closed position to the opened position. A recess 131 may be formed in the door 130 of the stowage compartment 120 so that the handle 150 is essentially flush with the exterior surface of the door in the closed position. The handle 150 is positioned adjacent one of the opposed ends 129 of the stowage compartment. The location of the handle 150 at one or both opposed ends 129 reduces the segmented look and feel of aircraft interiors configured with conventional overhead luggage bins. In addition, adjacent overhead luggage bins 110 combine together to form an extended longitudinal design element that is particularly well suited for use with conventional aircraft ceiling panels and other structural components of the aircraft interior 112. Furthermore, locating the handles 150 of adjacent overhead luggage bins 110 next to one another permits a passenger or crew member to open both luggage bins at the same time. Preferably, the at least one door comprises an upper door 130 and a lower door 140, as previously described and as shown herein in FIG. 5. As such, the handle 150 may be configured for pull-down operation that provides seated passengers with convenient access to carry-on items stowed within the stowage compartment 120.

Figure 6:
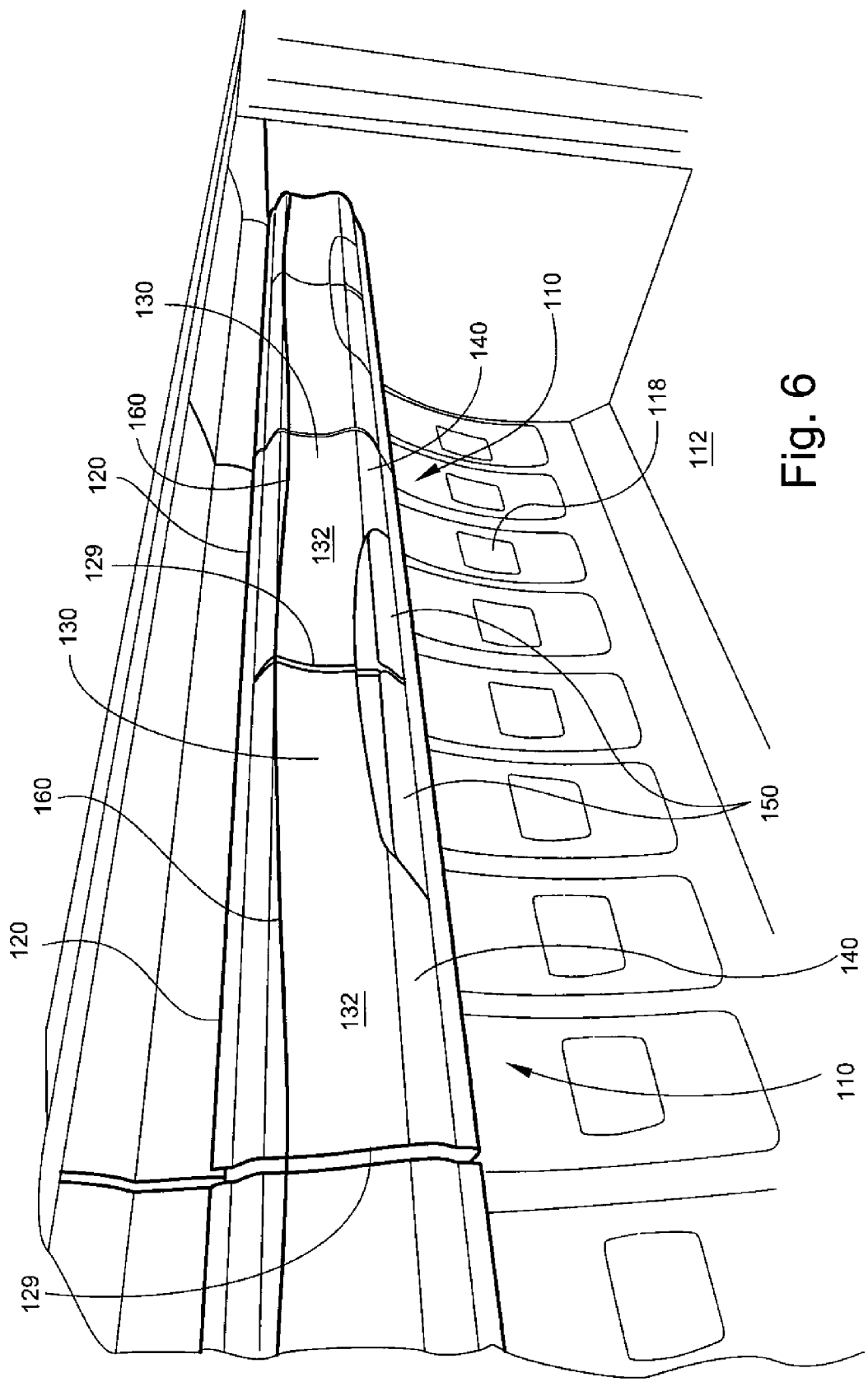
FIG. 6 is an environmental perspective view showing another exemplary embodiment of an overhead luggage bin configured in accordance with the present invention to be more aesthetically pleasing
Figure 7:
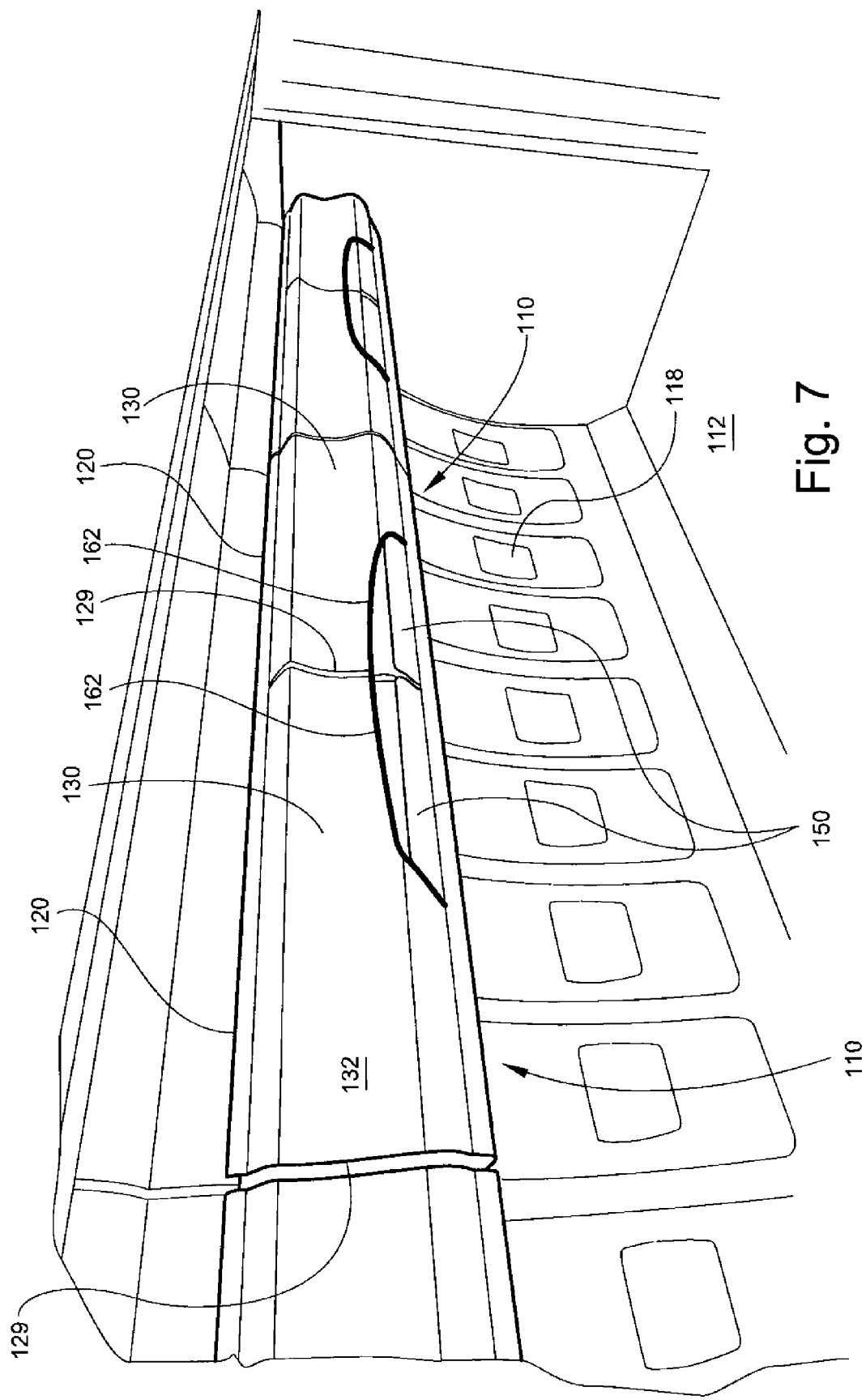
FIG. 7 is another environmental perspective view showing the exemplary embodiment of the overhead luggage bin of FIG. 6.

In another exemplary embodiment shown in FIG. 6 and FIG. 7, the overhead luggage bin 110 further comprises at least one ridgeline 160 disposed on the exterior surface 132 of the upper door 130. In one embodiment, the ridgeline 160 disposed on the exterior surface 132 is non-linear. In a further embodiment, the ridgeline 160 disposed on the exterior surface 132 is curvilinear and extends in a longitudinal direction along the length of the upper door 130 of the overhead luggage bin 110. As shown in FIG. 6, the ridgeline 160 is disposed on the exterior surface 132 of the upper door 130 and extends between the opposed ends 129 of the stowage compartment 120. As shown in FIG. 7, another ridgeline 162 may be provided around the handle 150 adjacent one of the opposed ends 129 of the stowage compartment 120. In this manner, the ridgelines 160 and 162 of adjacent overhead luggage bins 110 combine together to form extended longitudinal design elements that are well suited for use with conventional aircraft ceiling panels and other structural components of the aircraft interior 112. In yet another exemplary embodiment, at least one ridgeline 160 and/or 162 disposed on the exterior surface 132 of the overhead luggage bin 110, and more particularly on the exterior surface of the upper door 130, defines a compound curvature. In other words, the ridgeline 160, 162 has at least two points of inflection. The ridgeline 160, 162 may extend in either one or both of the longitudinal direction and a lateral direction towards the center of the aircraft interior 112.

The exterior surface 132 of the overhead luggage bin 110 may be further configured to have a relatively high reflectance as compared to the reflectance of a conventional overhead luggage bin used in a standard aircraft interior 112. In particular, the exterior surface 132 may have a reflectance for reflecting the illumination within the aircraft interior 12 that is greater than about 0.50 as measured on the albedo scale. Such a reflectance will reflect more ambient light than is absorbed. In this manner, the exterior surface 132 of the overhead luggage bin 110 will have a relatively glossy appearance, as compared to the relatively flat, matte-like finish of a conventional overhead luggage bin used in a conventional aircraft interior. Preferably, the reflectance of the exterior surface 132 of the overhead luggage bin 110 is at least about 0.60, and more preferably, the reflectance is at least about 0.75. The use of "natural" light as opposed to "synthetic" light may be employed to enhance the aesthetic quality of the reflectance of the exterior surface 132 of the overhead luggage bin 110. For example, the use of natural light in the aircraft interior 112 can soften the feel of the atmosphere and create a natural empathy. In addition, the use of natural light re-focuses passengers' attention away from the windows 118 of the aircraft towards the sky (i.e. the ceiling of the aircraft).

Figure 8:
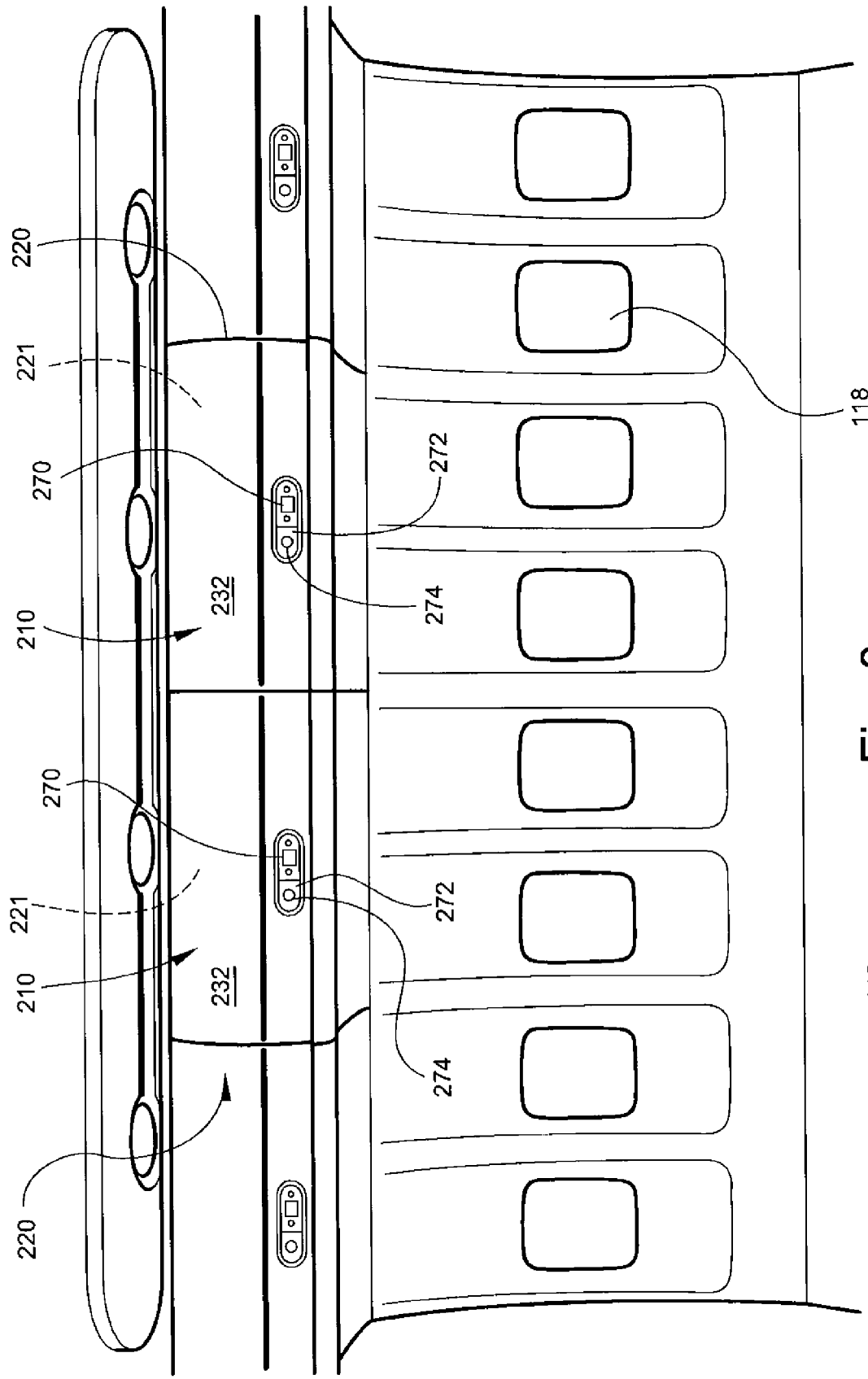
FIG. 8 is an environmental perspective view showing another exemplary embodiment of an overhead luggage bin configured in accordance with the present invention to provide increased RFID functionality.
Figure 9:
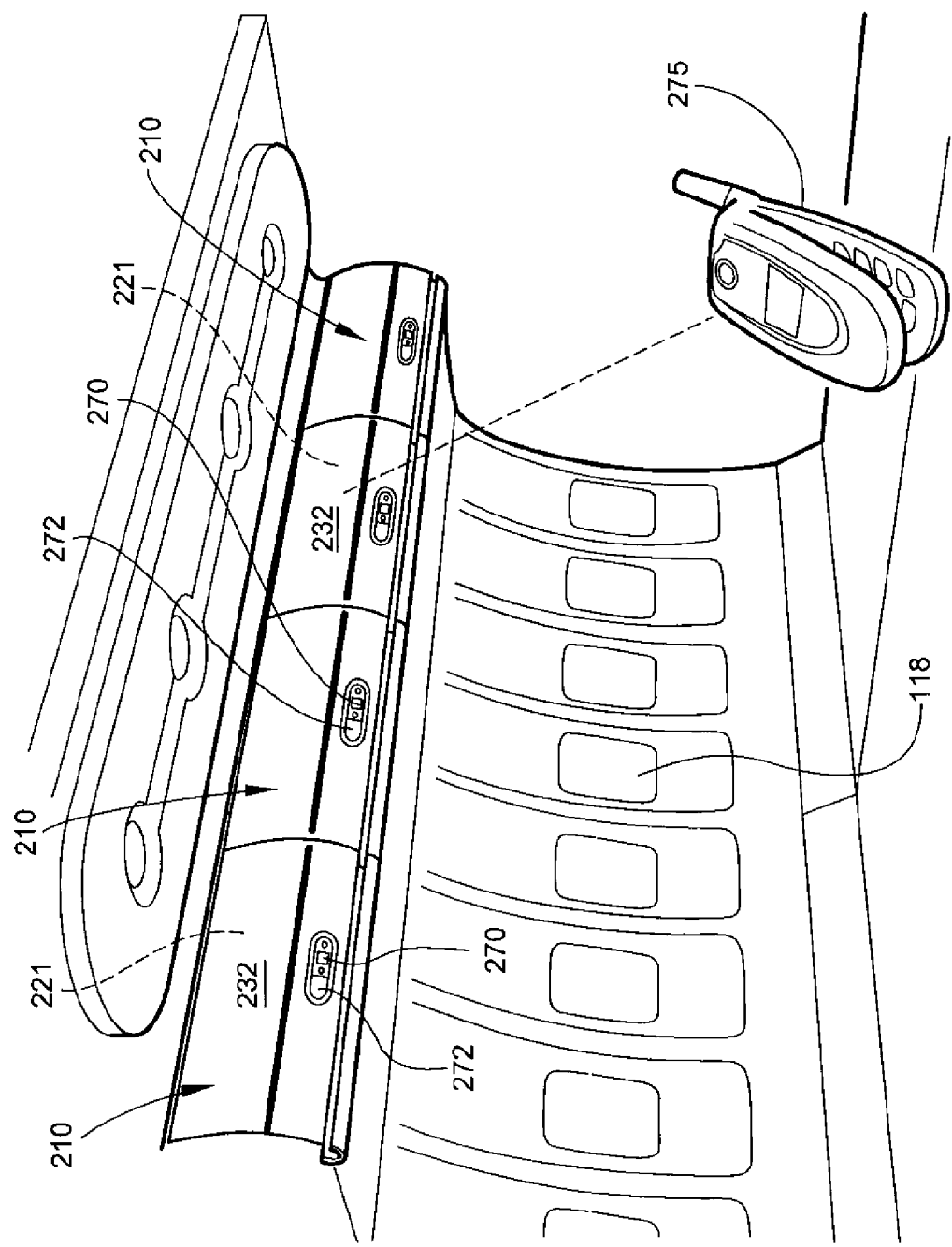
FIG. 9 is another environmental perspective view showing the exemplary embodiment of the overhead luggage bin of FIG. 8.

In yet another exemplary embodiment shown in FIG. 8 and FIG. 9, an overhead luggage bin 210 further comprises an RFID reader (i.e. receiver) 270 for increasing the use of present and future RFID technology. Preferably, the RFID reader 270 is disposed on the exterior surface 232 of the overhead luggage bin 210 so that the status of the RFID reader may be determined by a passenger or crew member within the aircraft cabin, as will be discussed, without requiring the overhead luggage bin 210 to be opened. However, the RFID reader 270 may be conveniently located anywhere, for example within the interior cavity 221 of the stowage compartment 220, and the status of the RFID reader indicated elsewhere in a readily visible location. Alternatively, the RFID reader 270 may be provided with an audible indicator. Regardless, the RFID reader 270 is operably associated with an RFID locator 272 for indicating when the RFID reader identifies a predetermined condition. For example, the RFID reader 270 may be configured to be operable for receiving a radio frequency (RF) signal and indicating that an item corresponding to the RF signal is located within the interior cavity 221 of the stowage compartment 220. This feature may be helpful to assist passengers to locate carry-on items, and particularly luggage, upon departure from the aircraft. In another example, a passenger's carry-on luggage and ticket stub are encoded with an RF identifier, and the RFID reader 270 is programmed to determine when a matching ticket stub and carry-on luggage are in close proximity. The RFID locator 272 then indicates that the carry-on luggage is stowed within the interior cavity 221 of the corresponding stowage compartment 220, for example by flashing a visible light source, such as an LED 274. The RFID reader 270 and RFID locator 272 may also be used by a passenger or crew member to locate an overhead luggage bin 210 having space available for additional carry-on items. Alternatively, or in addition, the RFID reader 270 may be configured to be operable for receiving a radio frequency (RF) signal and causing the RFID locator 272 to indicate when an electronic device 275, such as a mobile phone or computer, located within the interior cavity 221 of the stowage compartment 220 is in a "power on" state.

Figure 10:
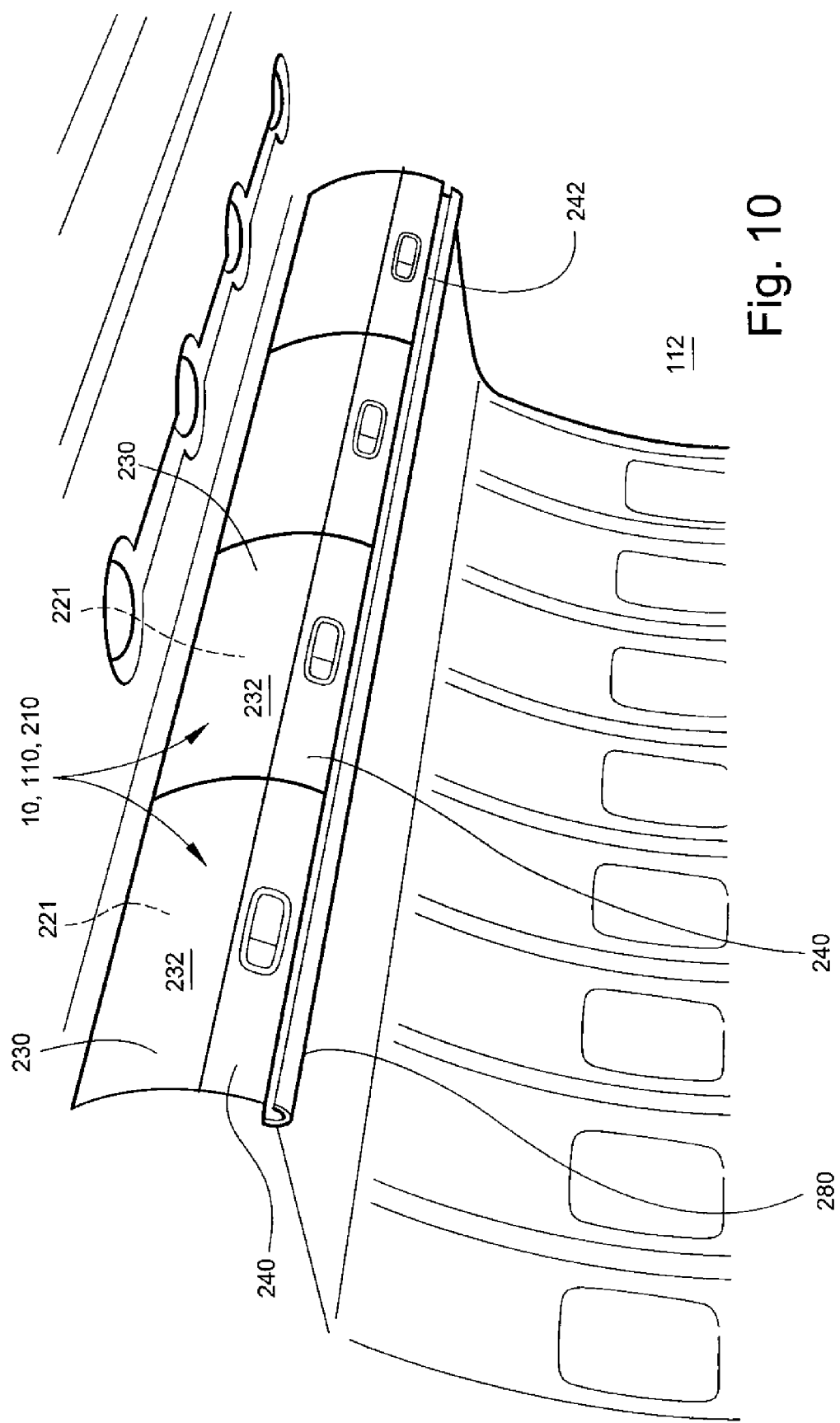
FIG. 10 is an environmental perspective view showing another exemplary embodiment of an overhead luggage bin configured in accordance with the present invention to provide an integrated handrail.

As shown in FIG. 10, any of the embodiments of the overhead luggage bin 10, 110, 210 previously described may further comprise an integrated handrail 280 for assisting a passenger, and in particular an elderly passenger, to enter and/or exit a seat beneath the overhead luggage bin. The handrail 280 is integrated with the exterior surface 232 of the overhead luggage bin 10, 110, 210. Preferably, the handrail 280 is integrated with the door 230 of the overhead luggage bin 210 and extends in the longitudinal direction along the entire length of the stowage compartment 220. In one exemplary embodiment, the door 230 includes an upper door 230 movably mounted on the stowage compartment 220 and a lower door 240 movably mounted on the aircraft interior 12. The handrail 280 may be integrated with the lower door 240 along a longitudinal hinge line 242 such that operation of the lower door does not interfere with use of the handrail. In a further embodiment, the upper door 230 and the lower door 240 are each movable between a closed position and an opened position to provide access to the interior cavity 221 of the stowage compartment 220.

The foregoing detailed description has described one or more exemplary embodiments of an overhead luggage bin for an aircraft interior. The overhead luggage bin provides improved ergonomics and accessibility to the interior cavity of the stowage compartment, is more aesthetically pleasing, and provides increased RFID functionality. While particular embodiments of the present invention have been described, it will be apparent to those skilled in the art that various modifications thereto can be made without departing from the spirit and scope of the invention. Accordingly, the foregoing description of exemplary embodiments of the invention and the best mode for practicing the invention are provided for the purpose of illustration only and not for purposes of limitation.

That which is claimed is:

1. An overhead luggage bin for an aircraft interior comprising:
   a generally hollow stowage compartment defining an interior cavity;
   an upper door attached to the stowage compartment and movable between a closed position and an opened position; and
   a lower door attached to the aircraft interior and movable between the closed position and the opened position;
   wherein the stowage compartment comprises a floor having a first portion and a second portion adjacent the lower door that is movably attached to the first portion;
   wherein the first portion is non-movable with respect to the stowage compartment; and
   wherein the second portion rotates downwardly relative to the first portion to define a ramp surface extending from the first portion in the direction of the lower door in the opened position.

2. An overhead luggage bin according to claim 1, wherein the upper door is rotatably attached to the stowage compartment and wherein the lower door is rotatably attached to the aircraft interior.

3. An overhead luggage bin according to claim 1, wherein the second portion of the floor of the stowage compartment is rotatably attached to the first portion.

4. An overhead luggage bin according to claim 1, wherein the second portion of the floor defines an angle of at least about five degrees (5°) and no more than about forty-five degrees (45°) with the first portion.

5. An overhead luggage bin according to claim 1, wherein the first portion of the floor is fixed at a predetermined height and wherein a vertical distance required to access the interior cavity of the stowage compartment is as much as about seven inches (7") less than the predetermined height.

6. An overhead luggage bin according to claim 1, further comprising biasing means for assisting movement of the upper door and the lower door between the closed position and the opened position.

7. An overhead luggage bin according to claim 1, wherein the stowage compartment includes opposed ends, the stowage compartment further comprising:
   at least one handle operable to effect movement of the lower door from the closed position to the opened position, the handle positioned adjacent one of the opposed ends of the stowage compartment.

8. An overhead luggage bin according to claim 7, wherein a recess is formed in at least one of the upper door and lower door so that the handle is essentially flush with an exterior surface of the lower door in the closed position.

9. An overhead luggage bin according to claim 7, wherein the handle comprises a spring-loaded retaining latch configured to retain the lower door in the closed position and to release the door for movement from the closed position to the opened position.

10. An overhead luggage bin of claim 1, further comprising:
    at least one non-linear ridgeline disposed on an exterior surface of the stowage compartment.

11. An overhead luggage bin according to claim 10, wherein the non-linear ridgeline is curvilinear and extends in a longitudinal direction.

12. An overhead luggage bin according to claim 10, further comprising a handle positioned on the exterior surface of the stowage compartment and wherein the non-linear ridgeline is provided around a periphery of the handle.

13. An overhead luggage bin according to claim 10, wherein the non-linear ridgeline defines a complex curvature.

14. An overhead luggage bin according to claim 1, further comprising:
   an exterior surface having a reflectance of an illumination within the aircraft interior greater than at least about 0.50 as measured on the albedo scale.

15. An overhead luggage bin according to claim 1, further comprising:
   an RFID reader disposed on an exterior surface of the stowage compartment, the RFID reader comprising an RFID logic circuit operable for indicating when the RFID reader identifies a predetermined condition.

16. An overhead luggage bin according to claim 15, wherein the RFID reader is operable for receiving a radio frequency (RF) signal and indicating that a corresponding item is located within the interior cavity of the stowage compartment.

17. An overhead luggage bin according to claim 15, wherein the RFID reader is operable for receiving a radio frequency (RF) signal and indicating when an electronic device located within the interior cavity of the stowage compartment is in a "power on" state.

18. An overhead luggage bin according to claim 1, wherein at least one of the upper door and lower door has an integrated handrail.

* * * * *